United States Patent
Uchino et al.

(10) Patent No.: US 10,057,930 B2
(45) Date of Patent: Aug. 21, 2018

(54) MOBILE COMMUNICATION SYSTEM AND USER EQUIPMENT

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/114,195

(22) PCT Filed: Feb. 5, 2015

(86) PCT No.: PCT/JP2015/053262
§ 371 (c)(1),
(2) Date: Jul. 26, 2016

(87) PCT Pub. No.: WO2015/125623
PCT Pub. Date: Aug. 27, 2015

(65) Prior Publication Data
US 2017/0013673 A1    Jan. 12, 2017

(30) Foreign Application Priority Data
Feb. 19, 2014 (JP) ................................ 2014-029795

(51) Int. Cl.
*H04W 76/04* (2009.01)
*H04W 52/02* (2009.01)
(Continued)

(52) U.S. Cl.
CPC ............. *H04W 76/048* (2013.01); *H04L 5/14* (2013.01); *H04L 43/0864* (2013.01);
(Continued)

(58) Field of Classification Search
CPC ......... H04W 72/0453; H04W 52/0216; H04W 52/0229; H04W 72/0413; H04W 72/0446;
(Continued)

(56) References Cited

U.S. PATENT DOCUMENTS 9,386,602 B2 *    7/2016    Wang ...................... H04L 5/14
                                                370/278
2011/0267978 A1 *  11/2011   Etemad .................. H04L 5/003
                                                370/254

(Continued)

FOREIGN PATENT DOCUMENTS

JP    H04-283032 A    10/1992
JP    H11-301850 A    11/1999
(Continued)

OTHER PUBLICATIONS

Qualcomm, "Solutions for TDD-FDD CA", Oct. 7-11, 2013, 3GPP TSG RAN WG1 #74bis, R1-134610, pp. all.*

(Continued)

*Primary Examiner* — Un C Cho
*Assistant Examiner* — Shah Rahman
(74) *Attorney, Agent, or Firm* — Osha Liang LLP (57) ABSTRACT

In TDD-FDD carrier aggregation, delay in downlink retransmission timing and UE's battery energy consumption are reduced. In a mobile communication system that performs carrier aggregation using a first component carrier associated with a first cell conducting radio communication in a first duplex mode and a second component carrier associated with a second cell conducting radio communication in a second duplex mode, a cell is provided on which an uplink control channel carrying acknowledgement or negative acknowledgement for the first component carrier and the second component carrier is transmitted, and a user equipment performs discontinuous reception using a timer value (Continued)

corresponding to a duplex mode of said cell on which the uplink control channel is transmitted upon receiving at least one of a first downlink data signal transmitted over the first component carrier and a second downlink data signal transmitted over the second component carrier.

2 Claims, 6 Drawing Sheets

(51) Int. Cl.
  H04L 5/14     (2006.01)
  H04L 12/26    (2006.01)
  H04W 72/04    (2009.01)
  H04W 76/28    (2018.01)
  H04W 84/04    (2009.01)
(52) U.S. Cl.
  CPC ... *H04W 52/0216* (2013.01); *H04W 52/0229* (2013.01); *H04W 72/0413* (2013.01); *H04W 72/0446* (2013.01); *H04W 76/28* (2018.02); *H04W 84/042* (2013.01); *Y02D 70/00* (2018.01); *Y02D 70/1262* (2018.01); *Y02D 70/1264* (2018.01); *Y02D 70/24* (2018.01)
(58) Field of Classification Search
  CPC . H04W 76/048; H04W 84/042; H04W 28/04; H04W 72/04; H04W 76/28; H04L 5/001; H04L 1/1851; H04L 1/1854; H04L 1/1864; H04L 1/1812; H04L 1/1825; H04L 43/0864; H04L 5/14; Y02B 60/50; Y02D 70/00; Y02D 70/1262; Y02D 70/1264; Y02D 70/24
  USPC .......................................................... 370/311
  See application file for complete search history.

(56) References Cited

U.S. PATENT DOCUMENTS

| | | | | |
|---|---|---|---|---|
| 2012/0106404 A1* | 5/2012 | Damnjanovic | ......... | H04L 5/001 370/279 |
| 2012/0176950 A1* | 7/2012 | Zhang | ..................... | H04L 5/001 370/311 |
| 2012/0257552 A1* | 10/2012 | Chen | ........................ | H04L 5/001 370/280 |
| 2012/0281600 A1* | 11/2012 | Tseng | .................. | H04W 76/048 370/280 |
| 2012/0327821 A1* | 12/2012 | Lin | ..................... | H04W 72/048 370/280 |
| 2013/0163497 A1* | 6/2013 | Wei | ....................... | H04L 5/0007 370/311 |
| 2013/0201884 A1 | 8/2013 | Freda et al. | | |
| 2014/0029459 A1* | 1/2014 | Kwon | .................. | H04W 76/048 370/252 |
| 2014/0071860 A1* | 3/2014 | Susitaival | ......... | H04W 52/0216 370/280 |
| 2015/0023229 A1* | 1/2015 | Yin | ........................ | H04L 5/0032 370/280 |
| 2015/0085711 A1* | 3/2015 | Wang | ........................ | H04L 5/14 370/280 |
| 2015/0200751 A1* | 7/2015 | Yin | ........................... | H04L 1/18 370/280 |
| 2015/0200752 A1* | 7/2015 | Yin | ........................ | H04L 1/1887 370/280 |
| 2015/0230268 A1* | 8/2015 | Chen | ......................... | H04L 5/14 370/280 |
| 2015/0304095 A1* | 10/2015 | Larsson | ................ | H04L 1/1861 370/280 |
| 2015/0365831 A1* | 12/2015 | Ko | ......................... | H04L 5/0053 370/329 |
| 2016/0013896 A1* | 1/2016 | Sun | ........................ | H04L 1/1854 370/280 |
| 2016/0081111 A1* | 3/2016 | Yi | ........................... | H04L 5/001 370/280 |

FOREIGN PATENT DOCUMENTS

| | | | | |
|---|---|---|---|---|
| JP | 2004-068838 | A | 3/2004 | |
| JP | 2007-160414 | A | 6/2007 | |
| JP | 2008-068374 | A | 3/2008 | |
| JP | 2010-214537 | A | 9/2010 | |
| JP | 2012-235470 | A | 11/2012 | |
| JP | 2013-506357 | A | 2/2013 | |
| WO | 2013115695 | A1 | 8/2013 | |
| WO | WO 2015089833 | A1 * | 6/2015 | ............... H04L 1/18 |

OTHER PUBLICATIONS

ZTE, "Issues for TDD-FDD CA", Oct. 7-11, 2013, 3GPP TSG RAN WG1 Meeting #74bis, R1-134851, pp. all.*
Alcatel-Lucent, "Scheduling and HARQ timing for TDD-FDD carrier aggregation", Oct. 7-11, 2013, 3GPP TSG RAN WG1 Meeting #74bis, R1-134212, pp. all.*
Qualcomm Incorporated, "Solutions for TDD-FDD CA", Oct. 7-11, 2013, 3GPP TSG RAN WG1 #74bis R1-134610, pp. all.*
International Search Report issued in PCT/JP2015/053262 dated Apr. 14, 2015 (1 page).
Written Opinion of the International Searching Authority issued in PCT/JP2015/053262 dated Apr. 14, 2015 (3 pages).
International Preliminary Report on Patentability from PCT/JP2013/053262 dated Feb. 4, 2015 (4 pages).
3GPP TSG RAN Meeting #61; RP-131399; Nokia Corporation; "Updated WID: LTE TDD-FDD joint operation including Carrier Aggregation"; Porto, Portugal; , Sep. 3-6, 2013 (7 pages).
3GPP TS 36.321 vol. 10.10.0; "3rd Generation Partnership Project; Technical Specification Group Radio Access Network; Evolved Universal Terrestrial Radio Access (E-UTRA); Medium Access Control (MAC) protocol specification"; (Release 10) Dec. 2013.
Extended European Search Report issued in the counterpart European Patent Application No. 15751721.0, dated Jan. 16, 2017 (8 pages).
Office Action issued in European Application No. 15751721.0, dated Apr. 23, 2018 (6 pages).

* cited by examiner

PUCCH TRANSMISSION ONLY ON PCell

Use HARQ RTT timer value corresponding to duplexing mode of PCell over which PUCCH is transmitted

FIG.4

PUCCH TRANSMISSION ONLY ON SCell

Use HARQ RTT timer value corresponding to duplexing mode of SCell #1 over which PUCCH is transmitted

OPERATIONS OF
PROPOSED TECHNIQUE

FIG.9

MOBILE COMMUNICATION SYSTEM AND USER EQUIPMENT

TECHNICAL FIELD

The present invention relates to a mobile communication technology, and more particularly, to discontinuous receiving (DRX) control during carrier aggregation (CA) between different duplexing modes.

BACKGROUND ART

In Long Term Evolution (LTE) and LTE-advanced standardizations in Third Generation Partnership Project (3GPP), discontinuous reception (DRX) control is performed for the purpose of battery energy saving of user equipment (UE). See, for example, Non-Patent Document 1 listed below.

In DRX control, mechanisms for allowing a UE to transit to inactive states as smooth as possible are introduced. One of them is a hybrid automatic repeat request round-trip time (referred to as a "HARQ RTT") timer. The HARQ RTT timer is used to determine timing for data retransmission during reception of downlink data. As long as the HARQ RTT timer is running, UE does not have to become the active mode for at least the data retransmission because it is unlikely to receive retransmitted data until the timer is up. Although a UE may be in the active state during the duration of the HARQ RTT timer counting due to other conditions, such exceptional conditions are excluded in this context.

Meanwhile, in LTE Release 10 and the subsequent releases, carrier aggregation (CA) for aggregating multiple component carriers (CCs) supported by the same base station or evolved node B (eNB) has been specified to improve the throughput. This type of carrier aggregation may be named "intra-eNB CA". In Releases 10 and 11, only those component carriers operated in the same duplex mode are aggregate by carrier aggregation. In other words, the component carriers supported at the primary cell (PCell) and the secondary cell (SCell) respectively are operable in the same duplex mode, namely, both in frequency division duplexing (FDD) mode or both in time division duplexing (TDD) mode.

In Release 12, TDD-FDD carrier aggregation is discussed, which technique expands the conventional CA to carrier aggregation between different duplex modes. See, for example, Non-Patent Document 2 listed below.

LIST OF PRIOR ART DOCUMENTS

Non-Patent Document 1: 3GPP TS 36.321
Non-Patent Document 2: 3GPP TSG RAN Meeting #61, Porto, Portugal, 3 to 6 Sep. 2013, PR-131399

SUMMARY OF THE INVENTION

Technical Problem to be Solved

In TDD-FDD carrier aggregation, anticipated HARQ round-trip time varies depending on the duplex mode of the primary cell (PCell). This is because the component carrier used for transmission of acknowledgement (ACK) or negative acknowledgement (NACK) over the medium access control (MAC) layer is limited to a PCell component carrier (which component carrier may be referred to as "PCC") and accordingly, the HARQ round-trip time depends on the duplex mode of the PCell.

In TDD-FDD carrier aggregation, it is anticipated that both TDD and FDD can be configured at and operated by the PCell. In FDD mode, an uplink frequency resource and a downlink frequency resource are always available and the HARQ round-tip time (RTT) is constant (e.g., 8 ms). On the other hand, in TDD mode, different RTT values are defined depending on the configuration ratio between uplink (UL) subframes and downlink (DL) subframes because the processing delay time varies depending on the UL/DL subframe configuration ratio.

Since HARQ process is provided for each component carrier, a HARQ RTT time value is set for each of the PCell component carrier (PCC) and the SCell component carrier (SCC) independently.

When the PCell is operating in FDD mode, the SCell operating in TDD mode uses a HARQ RTT timer value according to the TDD configuration (abbreviated as "TDD Config"). In this case, downlink retransmission timing may be delayed.

When the PCell is operating in TDD mode, the SCell operating in FDD mode uses an FDD HARQ RTT timer value (e.g., 8 ms). In this case, the UE may be in the active state in a subframe in which no downlink retransmission is expected and battery consumption may increase.

It is one of the objectives of the present invention to prevent delay in downlink retransmission timing and/or unnecessary battery consumption at UEs under discontinuous reception control when TDD-FDD carrier aggregation is performed between different duplex modes.

Means for Solving the Problem

To solve the above-described technical problem, in one aspect of the invention, a mobile communication system that performs carrier aggregation using a first component carrier associated with a first cell for radio communication in a first duplex mode and a second component carrier associated with a second cell for radio communication in a second duplex mode, includes a cell on which an uplink control channel carrying acknowledgement or negative acknowledgement for the first component carrier and the second component carrier is transmitted; and a user equipment configured to perform discontinuous reception using a timer value corresponding to a duplex mode of said cell on which the uplink control channel is transmitted upon receiving at least one of a first downlink data signal transmitted over the first component carrier or a second downlink data signal transmitted over the second component carrier.

Advantageous Effect of the Invention

Discontinuous reception control can be performed appropriately, while preventing delay in downlink retransmission control timing and/or unnecessary battery consumption at UE, during TDD-FDD carrier aggregation between different duplex modes.

EMBODIMENTS TO CARRY OUT THE INVENTION

In order to solve the problems which may arise in TDD-FDD carrier aggregation due to the different HARQ RTT timer values for FDD and TDD, the following solutions are proposed in the embodiments.

(1) When acknowledgement (ACK) or negative acknowledgement (NACK) is reported over a single uplink control channel, namely, physical uplink control channel (PUCCH), the HARQ RTT timer value corresponding to the duplex mode of the cell over which the PUCCH is transmitted is used for all the component carriers involved in TDD-FDD carrier aggregation.

(2) When there are multiple cells over which PUCCHs are transmitted, then the HARQ RTT timer value corresponding to the duplex mode of each of the cells over which PUCCH is transmitted is used.

<First Embodiment>

In the first embodiment, a scenario in which ACK/NACK reporting responding to downlink data transmission is performed over a single PUCCH during TDD-FDD carrier aggregation is described.

Figure 1:
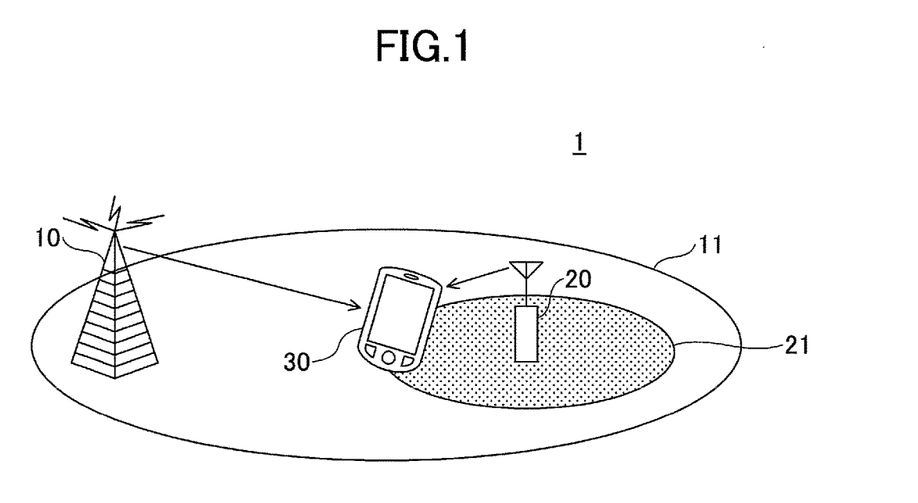
FIG. 1 is a schematic diagram to explain TDD-FDD carrier aggregation.

FIG. 1 is a schematic diagram of a mobile communication system 1 according to the embodiment. The mobile communication system 1 includes a first base station 10 operating in a first duplex mode, and a second base station 20 operating in a second duplex mode, and user equipment (UE) 30. The UE 30 transmits and receives data using a component carrier supported at the first base station 10 and a component carrier supported at the second base station 20.

The first base station 10 is, for example, a macro base station (or evolved node B abbreviated as "eNB") that supports FDD mode radio communication in its service area 11. The second base station 20 is, for example, remote radio equipment (RRE) connected to the macro base station, or alternatively, a small base station (eNB) 20 that supports TDD mode radio communication in its service area 21.

Figure 2:
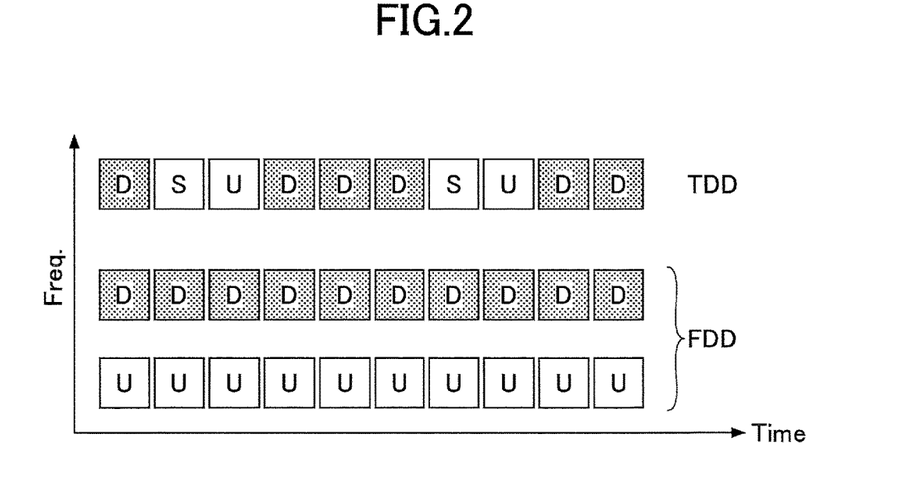
FIG. 2 illustrates an example of resource allocation in TDD and FDD.

FIG. 2 illustrates an example of resource allocation in TDD and FDD. In FDD, a frequency resource for uplink transmission and another frequency resource for downlink transmission are always available. Accordingly, the minimum transmission time is a fixed value defined by a summation of a downlink transmission time, an uplink transmission time (1 subframe each), a processing delay time at the UE 30, and a processing delay time at the macro eNB 10. The HARQ round-trip time of FDD is set to the minimum transmission time (e.g., 8 milliseconds).

On the other hand, in TDD, a frequency resource is shared between uplink and downlink and subframes are allocated to the uplink and the downlink in a time divided manner. Concerning the ratio between the downlink subframes (indicated as "D" in FIG. 2) and uplink subframes (indicated as "U" in FIG. 2), there are several types of UL/DL configurations are provided and a different round-trip time is provided for each of the uplink/downlink configurations. The symbol "S" denotes a special subframe for switching from downlink subframe (D) to uplink subframe (U).

For the sake of convenience, a component carrier operated in the FDD mode may be called a "FDD component carrier" and a component carrier operated in the TDD mode may be called a "TDD component carrier" in this specification.

Returning to FIG. 1, the UE 30 is configured with TDD-FDD carrier aggregation. For example, radio communication is conducted using a primary FDD component carrier supported at the macro eNB 10 and a secondary TDD component carrier supported at the small eNB 20.

UE 30 performs discontinuous reception (DRX) for battery energy saving, and carries out a HARQ process for each of the component carriers. During the HARQ process, the UE 30 uses an HARQ RTT timer value corresponding to the duplex mode of the cell on which PUCCH carrying ACK/NACK response is transmitted.

In this example, the macro eNB 10 is a primary cell (PCell) on which PUCCH carrying ACK/NACK is transmitted. Accordingly, this HARQ RTT timer value (e.g., 8 ms) of FDD is applied to the TDD component carrier supported at the SCell (small eNB 20).

During DRX control, the UE 30 in "RRC connected" state transits between two modes, namely, between active mode and inactive mode. In the active mode, the UE 30 monitors a physical downlink control channel (PDCCH) for each of the component carriers, and transmits feedback information such as a channel quality indicator (CQI) or precoding matrix indicator (PMI) as well as a sounding reference signal (SRS). In the inactive mode, the UE 30 does not monitor PDCCH nor transmit feedback information.

Upon receiving newly transmitted or retransmitted downlink data using both the FDD component carrier and the TDD component carrier, the UE 30 starts the HARQ RTT timer and transits to and stays in the in-active mode until the timer is up. The UE 30 may be in the active mode before the HARQ RTT timer has expired due to other conditions such as starting of an inactivity timer; however, such exceptional conditions are not taken into account in this context for explanation purpose. The UE 30 employs the same HARQ RTT timer value (8 ms in this example) for both the primary FDD component carrier and the secondary TDD component carrier. With this arrangement, delay in downlink retransmission timing and/or too early transition to the active mode can be prevented.

Figure 3:
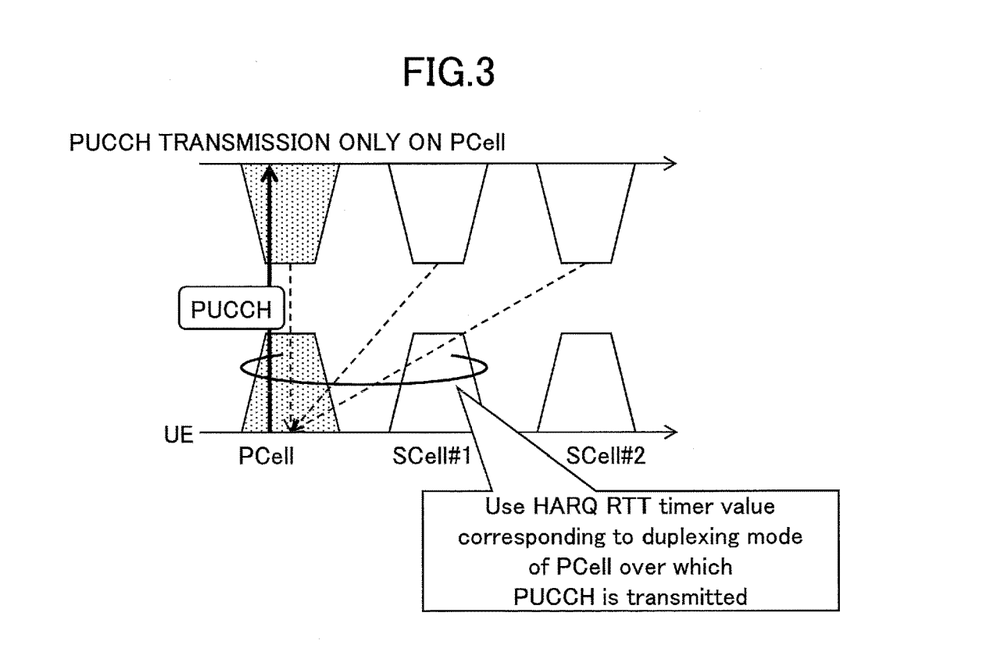
FIG. 3 illustrates an example of selection of HARQ timer during discontinuous reception control according to the first embodiment.

FIG. 3 illustrates an example of selection of an HARQ RTT timer value according to the first embodiment. The UE 30 receives downlink data under TDD-FDD carrier aggregation using a component carrier of PCell, a component carrier of SCell #1, and a component carrier of SCell #2. Depending on the error detection result of each of the component carriers, either an ACK or a NACK is multiplexed onto and transmitted via the PUCCH of the PCell. In this process, an HARQ RTT timer value corresponding to the duplex mode of the PCell on which the PUCCH carrying the ACK or NACK is transmitted is applied to all the component carriers involved in the TDD-FDD carrier aggregation. If the PCell is in the FDD mode, the HARQ RTT timer value for FDD is used for all the component carriers.

If the PCell is in the TDD mode, an HARQ RTT timer value corresponding to the "TDD config" of the PCell is used for all the component carriers.

Upon receiving the PUCCH, the base station (macro eNB 10 in this example) carries out retransmission scheduling for each of the component carriers according to the ACK/NACK responses of the respective component carriers contained in the PUCCH.

Figure 4:
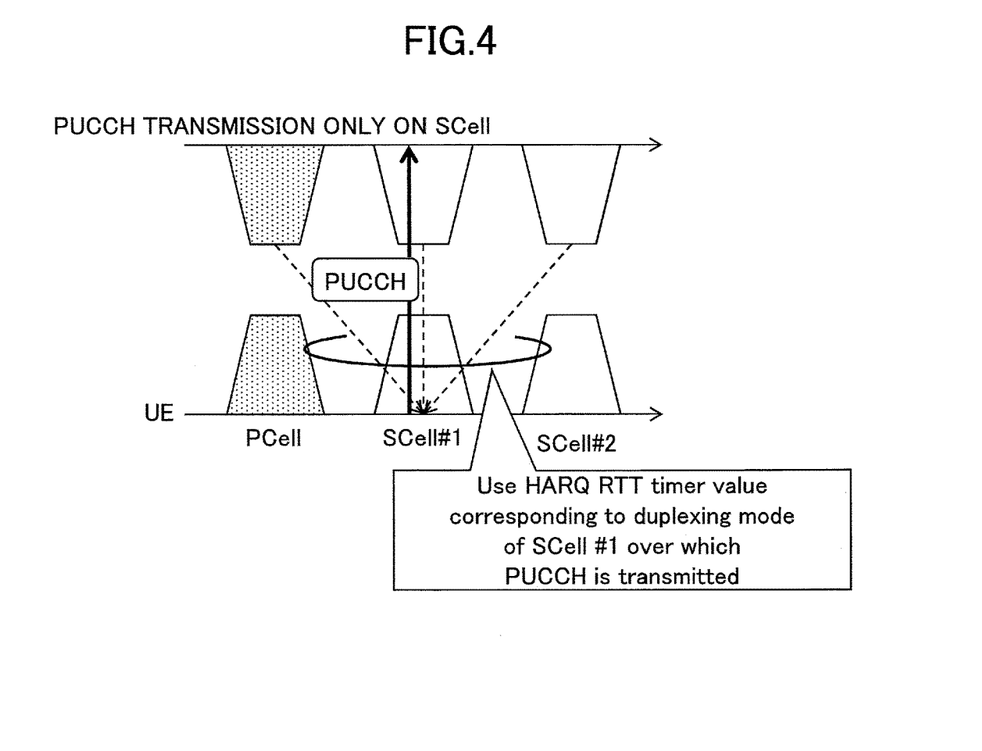
FIG. 4 illustrates another example of selection of HARQ timer during discontinuous reception control according to the second embodiment.

FIG. 4 illustrates another example of selection of an HARQ RTT timer value according to the first embodiment. In FIG. 4, ACK/NACK responses for the respective component carriers are transmitted via the PUCCH of the SCell #1. Similarly to FIG. 3, the UE 30 receives downlink data using a component carrier of PCell, a component carrier of SCell #1, and a component carrier of SCell #2. The ACK/NACK responses for the respective component carriers are multiplexed onto the PUCCH of the SCell #1. In this process, the HARQ RTT timer value corresponding to the duplex mode of the SCell #1 is applied to all the component carriers involved in the TDD-FDD carrier aggregation. If the SCell #1 is in the TDD mode, an HARQ RTT timer value corresponding to the "TDD config" of the SCell #1 is used for all the component carriers. If the SCell #1 is in the FDD mode, the minimum transmission time (e.g., 8 ms) is set as the HARQ RTT timer value for FDD is used for all the component carriers.

The SCell #1 may be a secondary cell operated under the macro eNB 10, or alternatively, it may be a cell operated under the small eNB 20. Because the PUCCH is used for retransmission requests, a low error rate is required. When the transmission quality of the component carrier of the TDD-mode SCell #1 is satisfactory during TDD-FDD carrier aggregation, it is quite likely to transmit an ACK/NACK via the PUCCH of the SCell #1 based upon the duality of the uplink and the downlink of TDD.

Upon receiving the PUCCH, the base station carries out retransmission scheduling for each of the component carriers according to the ACK/NACK responses of the respective component carriers contained in the PUCCH. Alternatively, the base station may report the ACK/NACK result to the macro eNB 10 that provides the PCell.

Figure 5:
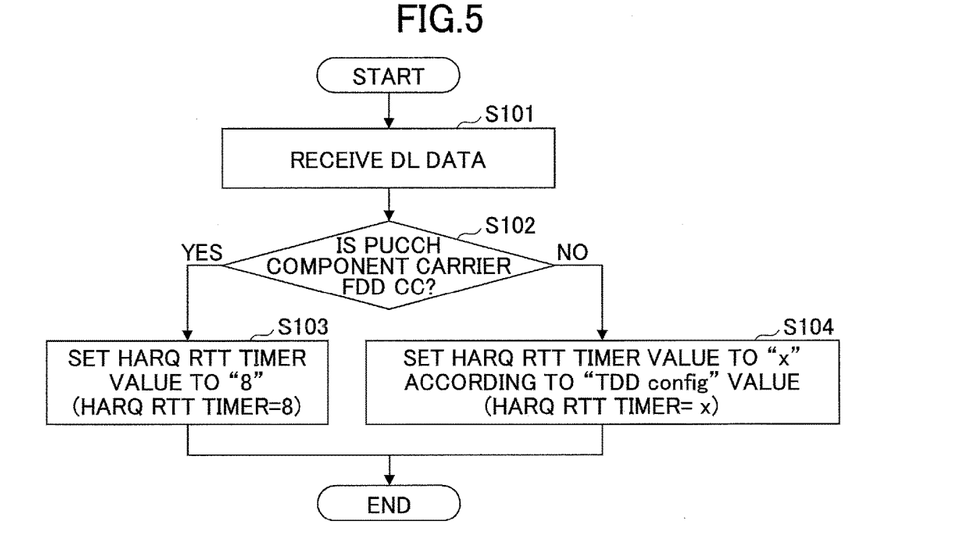
FIG. 5 is a flowchart of HARQ RTT timer control performed at user equipment.

FIG. 5 is a flowchart of discontinuous reception control executed at the UE 30. The operations in FIG. 5 are performed for each of the component carriers used in the TDD-FDD carrier aggregation.

Upon receiving downlink data (S101), the UE 30 determines whether the component carrier on which PUCCH for ACK/NACK response is transmitted is FDD component carrier (S102). If the PUCCH for ACK/NACK response is set to an FDD component carrier (YES in S102), the HARQ RTT timer value is set to a fixed value (e.g., 8 ms) defined by the FDD HARQ round-trip time (S103).

If the component carrier on which PUCCH for ACK/NACK response is transmitted is a TDD component carrier (NO in S102), the HARQ RTT timer value is set to a value according to the TDD configuration ("TDD config").

The control operations described above, can prevent delay in retransmission process for the UE 30 and/or unnecessary battery consumption at the UE 30 during TDD-FDD carrier aggregation. Besides, according to the first embodiment, retransmission control can be carried out using a single HARQ RTT timer value even in carrier aggregation between different duplex modes.

<Second Embodiment>

Figure 6:
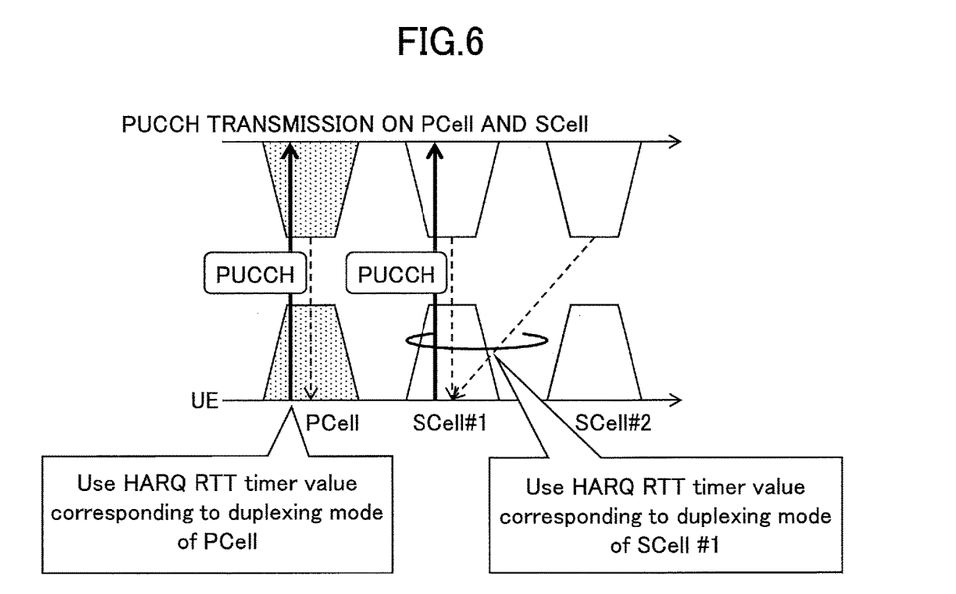
FIG. 6 illustrates an example of selection of HARQ RTT timer during discontinuous reception control according to the second embodiment.
Figure 7:
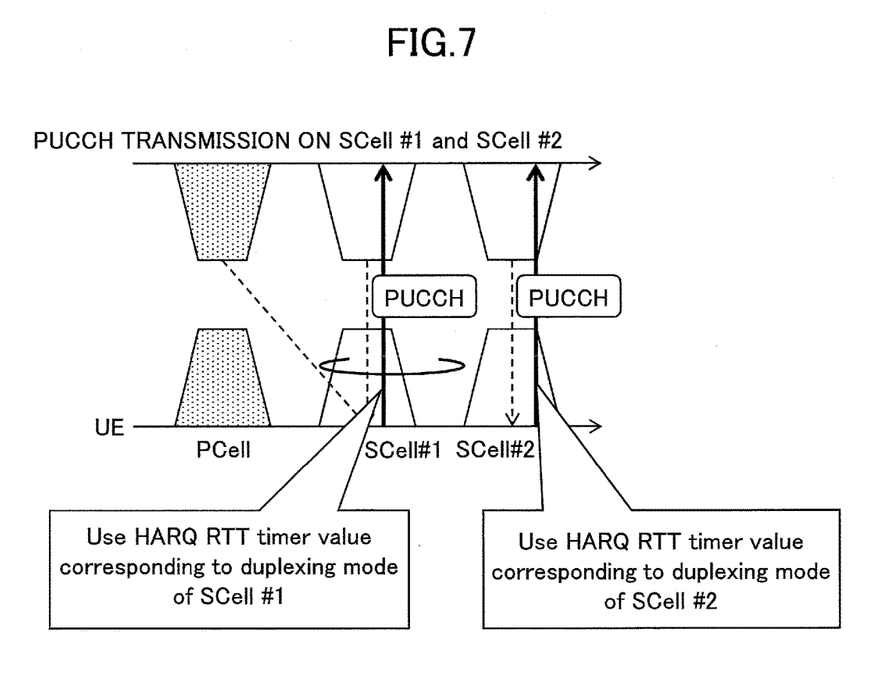
FIG. 7 illustrates another example of selection of HARQ RTT timer during discontinuous reception control according to the second embodiment.

FIG. 6 and FIG. 7 illustrate examples of selection of an HARQ RTT timer value according to the second embodiment. In the second embodiment, ACK/NACK transmission is carried out over multiple PUCCHs.

UE 30 receives downlink data under TDD-FDD carrier aggregation using a component carrier of PCell (PCC), a component carrier of SCell #1 (SCC #1), and a component carrier of SCell #2 (SCC #2), as in the first embodiment.

In the example of FIG. 6, the UE 30 is configured to transmit an ACK/NACK for the downlink PCC via the PUCCH of PCell and transmit ACK/NACK responses for the downlink SCC #1 and SCC #2 via the PUCCH of SCell #1.

The UE 30 uses the HARQ RTT timer value for PCC in accordance with the duplex mode of the PCell and an HARQ RTT timer value for SCC #1 and SCC #2 in accordance with the duplex mode of the SCell #1.

For example, when PCell is supported at the macro eNB 10 operating in FDD mode and when SCell #1 and SCell #2 are supported at the small eNB 20 operating in TDD mode, then the HARQ RTT timer value for PCell is set to 8 ms and the HARQ RTT timer value for SCell #1 and SCell #2 is set to a value corresponding to the "TDD Config" of SCell #1.

This arrangement is advantageous because delay in retransmission timing and/or unnecessary battery consumption can be reduced, while minimizing the number of HARQ RTT timers, during TDD/FDD carrier aggregation.

FIG. 7 illustrates another example. In FIG. 7, the UE 30 is configured to transmit ACK/NACK responses for the downlink PCell component carrier (PCC) and downlink component carrier of Scell #1 (SCC #1) over the PUCCH of PCell and transmit an ACK/NACK response for the downlink component carrier of Scell #2 (SCC #2) over the PUCCH of SCell #2.

Upon receiving the downlink data over the respective component carriers, the UE 30 uses an HARQ RTT timer value for PCC and SCC #1 in accordance with the duplex mode of the SCell #1 and an HARQ RTT timer value for SCC #2 in accordance with the duplex mode of the SCell #2.

For example, when PCell and SCell #1 are supported at the macro eNB 10 operating in FDD mode and when SCell #2 is supported at the small eNB 20 operating in TDD mode, then the HARQ RTT timer value for PCell and SCell #1 is set to 8 ms and the HARQ RTT timer value for SCell #2 is set to a value corresponding to the "TDD Config" of SCell #2.

The arrangement of FIG. 7 is also advantageous because delay in retransmission timing and/or unnecessary battery consumption at UE can be prevented, while minimizing the number of HARQ RRT timers, during TDD-FDD carrier aggregation.

Figure 8:
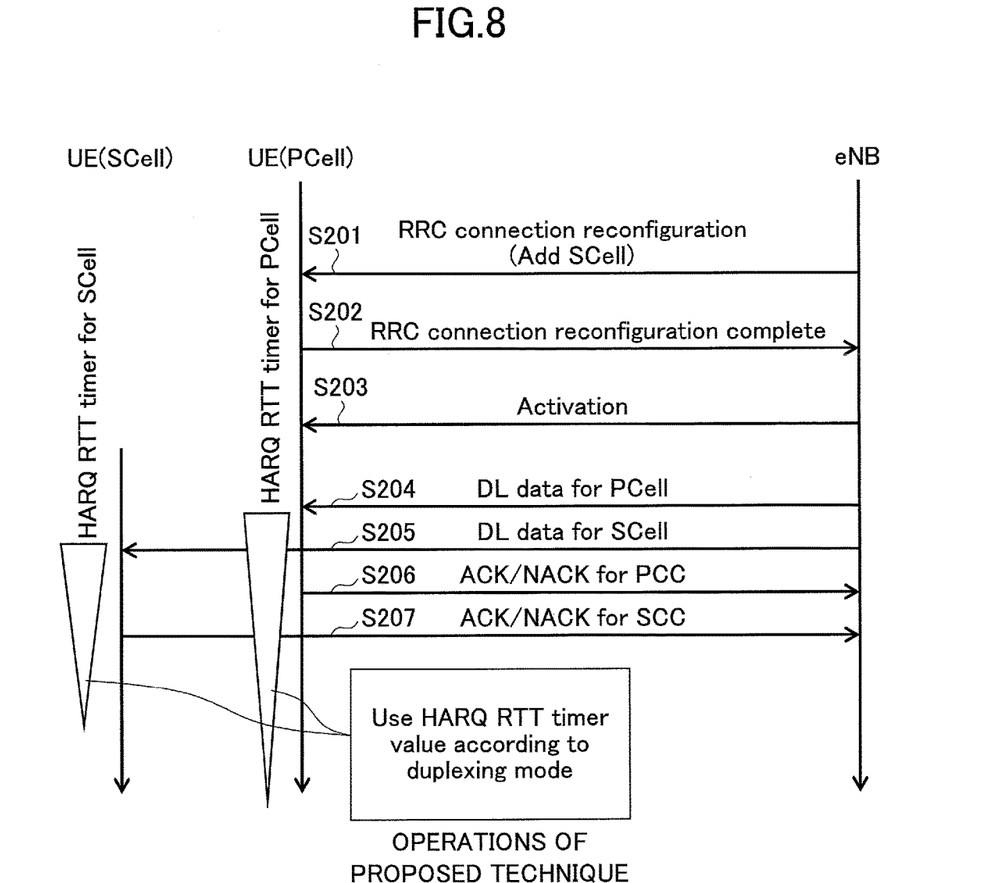
FIG. 8 is a sequence diagram of TDD-FDD carrier aggregation according to the second embodiment.

FIG. 8 is a sequence diagram illustrating procedures between the UE 30 and a base station (or eNB) when TDD-FDD carrier aggregation is performed according to the second embodiment.

First, a base station (for example, the macro eNB 10) that currently provides a PCell for the UE 30 adds a cell of a different duplex mode (provided by, for example, the small eNB 20) as a secondary cell (SCell) and reports the adding of the SCell to the UE 30 using a dedicated control signal such as an "RCC connection reconfiguration message" (S201).

The UE 30 configures itself to operate with the SCell and transmits a message indicating completion of adding the SCell to the eNB using a "RCC connection reconfiguration complete" message (S202).

Since the SCell immediately after the adding is in the "de-active" state, the eNB transmits a command for bringing the added SCell into the "Active" state (namely, schedulable state). (S203).

The eNB transmits downlink data to the UE 30 using a component carrier of PCell (PCC) (S204), and simultaneously, it transmits the downlink data to the UE 30 using a component carrier of the newly added SCell (SCC) with the different duplex mode (S205).

Upon receiving the downlink data over the PCC, the UE 30 activates a HARQ RTT timer for the PCell using a timer value according to the duplex mode of the PCell, and reports the error detection result of the downlink data over the PUCCH of the PCell (S206). Upon receiving the downlink data over the SCC, the UE 30 activates a HRRQ RTT timer for the SCell using a timer value according to the duplex mode of the SCell, and reports the error detection result of the downlink data over the PUCCH of the SCell (S207).

Thus, during carrier aggregation between different duplex modes, the HARQ timer for the PCell is activated using a timer value according to the duplex mode of the PCell and the error detection result of the downlink data is transmitted over the PUCCH of the PCell. The HARQ timer for the SCell is activated using a timer value according to the duplex mode of the SCell and the error detection result of the downlink data is transmitted via the PUCCH of the SCell.

The PUCCH for transmitting ACK/NACK may be designated semi-statically using a radio resource control (RRC) signal.

With this arrangement, discontinuous reception control can be performed according to the duplex mode of the cell on which PUCCH is transmitted, while reducing the number of HARQ RTT timers used during carrier aggregation between different duplex modes.

<Structure of UE>

Figure 9:
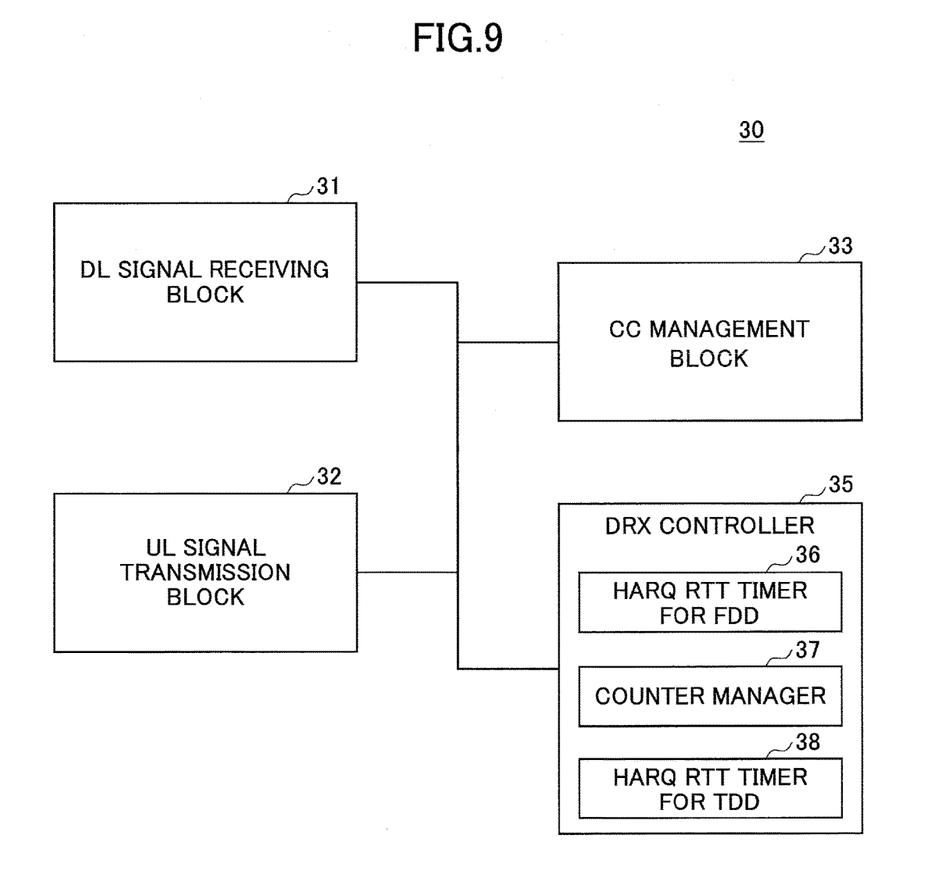
FIG. 9 is a block diagram of user equipment used in the embodiments.

FIG. 9 is a schematic block diagram of a mobile device (UE) according to the embodiment. UE 30 has a downlink (DL) signal receiving block 31, an uplink (UL) signal transmission block 32, a component carrier (CC) management block 33, and a discontinuous reception (DRX) controller 35.

The downlink signal receiving block 31 receives downlink data from cells of different duplex modes using the respective component carriers. The downlink signal receiving block 31 also receives various control signals including a dedicated control signal. The dedicated control signal may include a request for configuring, adding, and/or changing an SCell (a configure/add/change request) when performing carrier aggregation.

The UL signal transmission block 32 transmits error detection results for the downlink data on the PCell component carrier (PCC) and the SCell component carrier (SCC) over one or more PUCCH(s) of specific cell(s).

The CC management block 33 sets, adds and/or changes an SCell in response to the SCell configure/add/change request and manages the PCell component carrier and the SCell component carrier. When carrier aggregation between different duplex modes is carried out, the CC management block 33 may manage the component carriers of the respective cells in association with the corresponding duplex modes.

The CC management block 33 also manages setup information as to which cell(s) is/are used to transmit PUCCH(s) carrying ACK/NACK for the respective component carriers used in carrier aggregation.

The DRX controller 35 has a HARQ RTT timer 36 for FDD, a HARQ RTT timer 38 for TDD, and a counter manager 37 configured to manage the counter (or timer) values of the respective timers independently.

Upon receiving a downlink data signal at the DL signal receiving block 31, the DRX controller 35 determines PUCCH of which cell is to be used to transmit ACK/NACK for the respective component carriers, based upon the setup information managed in the CC management block 33. The DRX controller 35 activates at least one of the HARQ RTT timer 36 for FDD and the HARQ RTT timer 38 for TDD to allow the UE 30 to transit to the inactive state.

The HARQ RTT timer 36 for FDD is used when the cell on which the PUCCH is transmitted is operated in the FDD mode, and the timer value is set to, for example, 8 milliseconds (ms). The HARQ RTT timer 38 for TDD is used when the cell on which the PUCCH is transmitted is operated in the TDD mode, and a timer value according to the "TDD Config" of the PUCCH transmission cell is used.

With the above-described structure, delay in downlink retransmission timing and/or battery consumption at the UE 30 can be reduced under discontinuous reception control when performing TDD-FDD carrier aggregation.

There may be some UEs not capable of performing the above-described control operations. In this case, each UE may report its capability or performance ability to the eNB, and the above-described control operations may be applied to those UEs with capability of the above-described control technique.

In the foregoing examples, a small eNB serves as the second base station that provides an SCell used for carrier aggregation. However, the above-described control technique is applicable to carrier aggregation using an extended station such as one employing an RRE as the second base station (which carrier aggregation may be referred to as intra-eNB CA).

This patent application is based upon and claims the benefit of the priority of Japanese Patent Application No. 2014-029795 filed Feb. 19, 2014, which is incorporated herein by reference in its entirety.

What is claimed is:

1. A mobile communication system configured to perform carrier aggregation using a first component carrier associated with a first cell for radio communication in a first duplex mode and a second component carrier associated with a second cell for radio communication in a second duplex mode, comprising:
   a cell of said carrier aggregation on which an uplink control channel carrying acknowledgement or negative acknowledgement for the first component carrier and the second component carrier is transmitted; and
   a user equipment configured to perform discontinuous reception using a timer value corresponding to a duplex mode of said cell on which the uplink control channel is transmitted upon receiving at least one of a first downlink data signal transmitted over the first component carrier and a second downlink data signal transmitted over the second component carrier,
   wherein the first duplex mode and the second duplex mode are different duplex modes, and
   wherein when said cell on which the uplink control channel carrying the acknowledgement or the negative acknowledgement for the first component carrier and the second component carrier is transmitted is a secondary cell operated in time division duplexing mode, the user equipment is configured to use a timer value according to an uplink-downlink configuration ratio of subframes of the secondary cell for each of the first component carrier and the second component carrier when performing the discontinuous reception.

2. A user equipment used in a mobile communication system configured to perform carrier aggregation using a first component carrier associated with a first cell for radio communication in a first duplex mode and a second component carrier associated with a second cell for radio communication in a second duplex mode, comprising:
- a management block configured to manage a cell of said carrier aggregation on which an uplink control channel carrying acknowledgement or negative acknowledgement for the first component carrier and the second component carrier is transmitted; and
- a controller configured to perform discontinuous reception using a timer value corresponding to a duplex mode of said cell on which the uplink control channel is transmitted, based upon information managed at the management block, upon receiving at least one of a first downlink data signal transmitted over the first component carrier and a second downlink data signal transmitted over the second component carrier,
- wherein the first duplex mode and the second duplex mode are different duplex modes, and
- wherein when said cell on which the uplink control channel carrying the acknowledgement or the negative acknowledgement for the first component carrier and the second component carrier is transmitted secondary cell operated in time division duplexing mode, the controller is configured to use a timer value according to an uplink-downlink configuration ratio of subframes of the secondary cell for each of the first component carrier and the second component carrier when performing the discontinuous reception.

* * * * *